J. F. DIETZ.
SLED.
APPLICATION FILED DEC. 16, 1919.
1,335,096.
Patented Mar. 30, 1920.
Fig. 1.
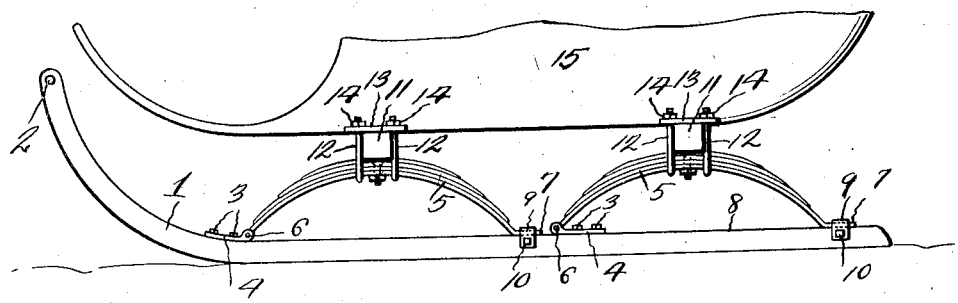
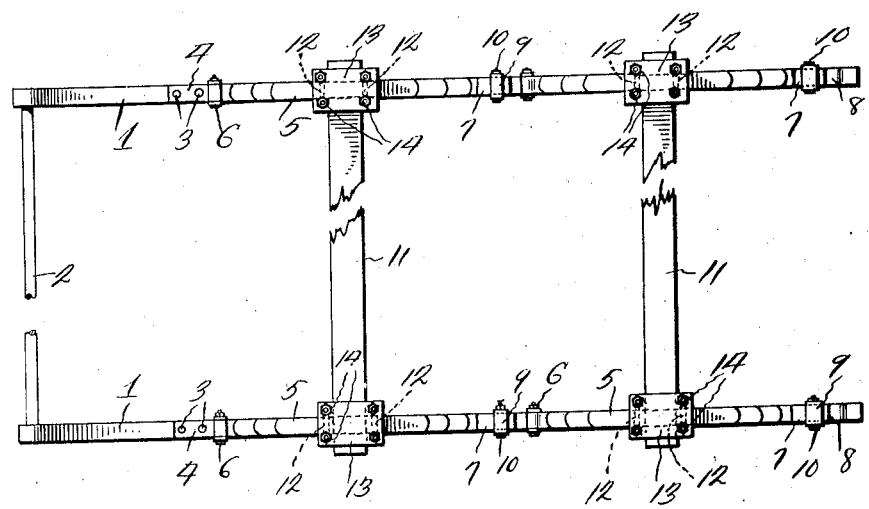
Fig. 2.
Inventor
JOHN F. DIETZ,
By D. Swift
Attorney

UNITED STATES PATENT OFFICE.

JOHN F. DIETZ, OF LOMA, NORTH DAKOTA.

SLED.

1,335,096.   Specification of Letters Patent.   Patented Mar. 30, 1920.

Application filed December 16, 1919. Serial No. 345,204.

*To all whom it may concern:*

Be it known that I, JOHN F. DIETZ, a citizen of the United States, residing at Loma, in the county of Cavalier, State of North Dakota, have invented a new and useful Sled; and I do hereby declare the following to be a full, clear, and exact description of the invention, such as will enable others skilled in the art to which it appertains to make and use the same.

The invention relates to sleds and has for its object to provide a sled wherein the body of the sled is supported on the sled runners by elliptic springs longitudinally disposed so that the shock upon the body of the sled will be taken up incident to the travel of the sled over rough roads and surfaces. Sleds and cutters of present construction have their bodies supported on the runners by means of sled knees, which knees are rigid and do not prevent the shocks and jars incident to the travel over the road of the sled from reaching the body of the sled.

A further object is to provide a sled comprising a pair of spaced runners, elliptic spring on each runner said elliptic springs having their forward ends pivotally secured to plates carried by the runners, the rear ends of said elliptic springs having slidable connections to the runners. The oppositely disposed springs being secured together by transversely disposed sills, to which sills the sled body is attached.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a side elevation of a sled showing the body thereof supported on elliptic springs carried by the runners.

Fig. 2 is a top plan view of the sled with the body removed.

Referring to the drawings, the numeral 1 designates spaced runners, which runners are preferably connected together at their forward ends by a transversely disposed bar 2. Runners 1 may be of any conventional form according to the type of sled on which they are used, it being understood that the spring device may be applied to all types and forms of sleds, therefore a conventional form of runner is shown for illustrated purposes. Secured to the runners 1 as at 3 are plates 4, to which plates elliptic springs 5 are pivotally secured as at 6, said elliptic springs extending upwardly rearwardly and downwardly and terminate in horizontally disposed portions 7 which bear upon the upper surface 8 of the runners and slidably engage the same during a bowing action of the elliptic springs 5. Horizontal portions 7 are held in slidable engagement with the upper surface 8 of the runners by means of U-shaped plates 9, which plates arch the portions 7 and are held on the runners 1 by means of transversely disposed bolts 10 which pass transversely through the runners 1 and through the downwardly extending arms of the U-shaped plates 9.

Transversely connecting the oppositely disposed elliptic springs 5 are sills 11. The sills 11 being secured to the elliptic springs, by means of U-shaped bolts 12 which extend around the springs 5 and have their upwardly extending arms passing through plates 13, there being nuts 14 threaded on the arms of the U-shaped bolts so that the ends of the sills 11 may be securely clamped to the elliptic springs. Any form of body 15 may be secured to the transversely disposed sills 11, however, for purposes of illustration a portion of what is known as a cutter body is shown.

It will be seen that as the runners 1 pass over a rough surface that elliptic springs 5 will bow incident to the shock and that during the bowing action, the portion 7 of the elliptic springs will be allowed to slide longitudinally so as to allow sufficient flexing of the elliptic springs 5. By pivoting the elliptic springs as at 6 the slidable movement of the horizontal portions 7 will not be interfered with as would be the case if there were a rigid connection at 6.

The invention having been set forth what is claimed as new and useful is:—

A sled comprising a pair of spaced runners and a body, said body being supported on the spaced runners by means of semi-elliptic springs, said semi-elliptic springs having their forward ends pivotally secured to the runners, the rear ends of the springs being provided with horizontally disposed members adapted to slidably engage the upper edges of the runners, U-shaped arching plates arching the horizontally disposed members of the rear ends of the springs, thereby preventing lateral displacement of the rear ends of the springs, the elliptic springs having their bowed portions extending upwardly, means for transversely connecting the oppositely disposed elliptic springs together, a body disposed on the connecting means between the springs of each runner, said slidable engagement of the rear ends of the springs allowing the semielliptic springs to flex during travel of the sled over the rough surface.

In testimony whereof I have signed my name to this specification in the presence of two subscribing witnesses.

JOHN F. DIETZ.

Witnesses:
 JACOB J. GRABER,
 C. J. GRABER.